(12) United States Patent
Diefenbacher et al.

(10) Patent No.: US 7,968,076 B2
(45) Date of Patent: Jun. 28, 2011

(54) METHOD FOR PRODUCING SODIUM DITHIONITE

(75) Inventors: Armin Diefenbacher, Germersheim (DE); Hartwig Voss, Frankenthal (DE); Reinhard Schneider, Fussgönheim (DE)

(73) Assignee: BASF SE, Ludwigshafen (DE)

( * ) Notice: Subject to any disclaimer, the term of this patent is extended or adjusted under 35 U.S.C. 154(b) by 449 days.

(21) Appl. No.: 11/666,973

(22) PCT Filed: Nov. 3, 2005

(86) PCT No.: PCT/EP2005/011786
§ 371 (c)(1),
(2), (4) Date: May 2, 2007

(87) PCT Pub. No.: WO2006/048293
PCT Pub. Date: May 11, 2006

(65) Prior Publication Data
US 2008/0187484 A1    Aug. 7, 2008

(30) Foreign Application Priority Data
Nov. 3, 2004    (DE) .................. 10 2004 053 090

(51) Int. Cl.
*C01B 17/66*    (2006.01)
(52) U.S. Cl. ........................................ 423/515
(58) Field of Classification Search .................. None
See application file for complete search history.

(56) References Cited

U.S. PATENT DOCUMENTS

| | | | |
|---|---|---|---|
| 4,017,593 A * | 4/1977 | Voelkl et al. ............. 423/515 |
| 4,042,674 A | 8/1977 | Yamamoto et al. | |
| 4,042,675 A | 8/1977 | Yamamoto et al. | |
| 4,144,146 A * | 3/1979 | Leutner et al. ............. 205/495 |
| 4,237,318 A | 12/1980 | Ostertag et al. | |
| 5,283,046 A * | 2/1994 | Winslow et al. ............ 423/515 |
| 5,792,441 A * | 8/1998 | Paleologou et al. ......... 423/531 |
| 6,117,315 A | 9/2000 | Masson et al. | |
| 6,454,929 B1 * | 9/2002 | Thiele et al. ............... 205/471 |

FOREIGN PATENT DOCUMENTS

| | | |
|---|---|---|
| DE | 2622952 A1 | 11/1976 |
| DE | 2651418 C2 | 5/1978 |
| DE | 2716032 C2 | 10/1978 |
| DE | 4437253 A1 | 5/1995 |
| EP | 0930535 A1 | 7/1999 |
| JP | 52138090 | 11/1977 |
| JP | 352138090 | * 11/1977 |
| JP | 53050090 | * 5/1978 |
| JP | 2001270844 | 10/2001 |

OTHER PUBLICATIONS

Database WPI Week 197801 Derwent Publications Ltd., London, GB; AN 1978-01138A, XP002406002 & JP 52 138090 A.

* cited by examiner

*Primary Examiner* — Melvin C Mayes
*Assistant Examiner* — Sheng H Davis
(74) *Attorney, Agent, or Firm* — Connolly Bove Lodge & Hutz LLP

(57) ABSTRACT

The invention relates to a process for the preparation of sodium dithionite, comprising the steps
(a) provision of a synthesis batch comprising sodium formate, sulfur dioxide and an alkaline sodium compound in aqueous methanolic solution with formation of a sodium dithionite mother liquor,
(b) isolation of sodium dithionite from the sodium dithionite mother liquor, a residual mother liquor being obtained,
(c) separation of methanol from the residual mother liquor,
(d) separation of the residual mother liquor into a thiosulfate-rich first part-stream and a thiosulfate-poor, formate-containing second part-stream by means of nanofiltration,
(e) concentration of sodium formate in the second part-stream and
(f) recycling of the concentrated second part-stream to process step (a).

8 Claims, No Drawings

METHOD FOR PRODUCING SODIUM DITHIONITE

RELATED APPLICATIONS

This application is a national stage application (under 35 U.S.C. §371) of PCT/EP2005/011786 filed Nov. 3, 2005, which claims benefit of German application 10 2004 053 090.4 filed Nov. 3, 2004.

The present invention relates to an improved process for the preparation of sodium dithionite by the formate process, in which sodium formate recovered from the wastewater is recycled to the synthesis batch.

The preparation of sodium dithionite from sodium formate, sulfur dioxide and an alkaline sodium compound in aqueous methanolic solution is disclosed in the prior art, for example in DE 2 716 032 C2.

In the production of sodium dithionite by the formate process, a wastewater which still comprises considerable amounts of sodium formate is obtained after the synthesis and the subsequent isolation of the product by filtration and the separation of the alcohol from the filtrate by distillation. In addition to sodium formate, sodium thiosulfate and salts of sulfurous acid are substantial components of the wastewater. Firstly, the loss of sodium formate and of sodium sulfite by the wastewater constitutes a loss of starting materials and secondly the formate results in considerable wastewater pollution (high TOC value). There is therefore a high economic incentive to recover at least a part of the starting materials comprised in the wastewater.

DE 2 651 418 C2 relates to a process for working up, with acids, mother liquors obtained in the preparation of sodium dithionite by the sodium formate process by reacting sodium formate, sulfur dioxide and an alkaline sodium compound in an aqueous alcoholic solution after isolation of the sodium dithionite. Alcohol and methyl formate are removed from the mother liquor by distillation, formic acid is added to the remaining mother liquor in amounts such that the pH is from 3.0 to 4.5, the mother liquor is heated to temperatures of from 75 to 110° C., the precipitated sulfur is separated off and sodium formate is isolated from the mother liquor.

DE 4 437 253 A1 relates to a process for the preparation of an anhydrous sodium dithionite by reacting sodium formate, sulfur dioxide and an alkaline sodium compound in aqueous methanolic solution in a first stage, isolating the precipitated product from the mother liquor, reducing the content of sodium thiosulfate in the mother liquor and recycling the resulting solution to the first stage. From 10 to 60 percent by weight of the water present in the mother liquor is removed from said mother liquor, and the remaining solution is cooled to a temperature of from −40 to 10° C. and the precipitate is separated off.

JP 2001-270844 describes a process for obtaining sodium formate from the wastewater of a sodium dithionite synthesis with the aid of a two-stage electrodialysis. In a first electrodialysis stage (cation exchange membrane, and anion exchange membrane selected for monovalent species), a formate and hydrogen sulfite is first obtained. In a further process stage, sulfite is then first oxidized to sulfate. In the subsequent electrodialysis stage, the pH is brought close to or greater than 7 and once again the divalent sulfate is separated from the monovalent formate. Such a multistage process is, however, very complicated. The oxidative intermediate step is very time-consuming in the case of oxidation with atmospheric oxygen and necessitates additional starting materials or assistants.

It was an object of the present invention to provide a process for the preparation of sodium dithionite, which comprises economical and technically realizable recovery of sodium formate from the wastewater, it being possible to recycle the recovered sodium formate to the synthesis.

This object is achieved, according to the invention, by a process for the preparation of sodium dithionite, comprising the steps (a) provision of a synthesis batch comprising sodium formate, sulfur dioxide and an alkaline sodium compound in aqueous methanolic solution with formation of a sodium dithionite mother liquor, (b) isolation of sodium dithionite from the sodium dithionite mother liquor, a residual mother liquor being obtained, (c) separation of methanol from the residual mother liquor, (d) separation of the residual mother liquor into a thiosulfate-rich first part-stream with a reduced concentration of formate and a thiosulfate-poor, formate-containing second part-stream by means of nanofiltration, (e) concentration of sodium formate in the second part-stream and (f) recycling of the concentrated second part-stream to process step (a).

Preferably, step (b) comprises isolation of sodium dithionite from the sodium dithionite mother liquor by filtration, and step (c) comprises separation of methanol from the residual mother liquor by distillation. Sodium compounds which can preferably be used for the sodium dithionite synthesis are, for example, sodium carbonate, sodium bicarbonate or sodium hydroxide.

By means of the process according to the invention, a part of the starting material costs advantageously can be saved by the working-up of the wastewater and the recycling of a part of the sodium formate to the synthesis, at the same time the TOC load of the wastewater produced being reduced. The recovery process is distinguished by low technical complexity and high cost-efficiency.

In order in particular to recover the sodium formate and to be able to use it again in the synthesis, the concentration of the sodium thiosulfate comprised in the wastewater must be substantially reduced since it constitutes an interfering component for steps (a) and (b) of the process according to the invention. This is effected, according to the invention, with the aid of a nanofiltration process.

Like reverse osmosis and ultrafiltration, nanofiltration is a pressure-operated membrane process for separating dissolved components from aqueous solutions. With regard to separation behavior, nanofiltration is to be classified between reverse osmosis and ultrafiltration, resulting in no sharp boundaries in the transition regions. A peculiarity of the nanofiltration membranes is their high ion selectivity: salts having monovalent anions can pass through the membrane to a high degree whereas salts having polyvalent ions are retained to a much higher degree.

In the present invention, the wastewater stream in step (d) of the process is divided into two part-streams at a suitable nanofiltration membrane. The thiosulfate ions preferably remain in the retentate (first thiosulfate-rich part-stream) since they are retained by the nanofiltration membrane in preference to the monovalent anions (for example, the formate ions). The formate ions can pass through the nanofiltration membrane in a high proportion so that the permeate (filtrate) thus obtained forms a second thiosulfate-poor, formate-containing part-stream.

All membranes which are stable in the respective system under the required separation conditions and which have a selectivity between monovalent and polyvalent anions are suitable for the membrane separation unit used in the nanofiltration in the process according to the invention. The separation layers of the membranes which can be used may consist of organic polymers, ceramic, carbon or combinations thereof. For mechanical reasons, the separation layers are as a rule built up on a one-layer or multilayer porous substructure which consists of the same material as the separation layer or of at least one different material.

The membranes are usually used in pressure-resistant housings which permit the separation of retentate (thiosulfate-rich part-stream) from permeate (thiosulfate-poor part-stream) under the pressure conditions required for the separation. The membranes may have a flat-sheet, tubular, multichannel element, capillary or spiral wound geometry, for which corresponding pressure-resistant housings which permit separation of retentate from permeate are available. Furthermore, a plurality of these elements can be combined in a housing to give a module.

Before recycling of the thiosulfate-poor, formate-containing second part-stream takes place, said part-stream is concentrated in step (e) to a lower water content since the synthesis takes place in a methanolic solution having a low water content. The recyclable amount is determined on the one hand by the acceptable residual concentration of thiosulfate in the recycle stream (concentrated permeate stream). On the other hand, the recyclable amount of formate may also be limited by the solubility limit of the salts comprised in the recycle stream, especially formate and salts of sulfurous acid, provided that a homogeneous solution is preferably to be metered as recycle stream to the synthesis batch.

In a preferred embodiment of the present invention, before step (d) is carried out, the pH of the residual mother liquor is brought to a pH differing from the pH of the residual mother liquor obtained in step (b) or (c). The pH of the residual mother liquor is preferably brought to between pH=4 and pH=6, particularly preferably between pH=4 and pH=4.5, before step (d) is carried out. As a result of this pH adjustment, the thiosulfate retention in the nanofiltration in step (d) can surprisingly be increased. In the residual mother liquor obtained as wastewater in the process according to the invention, a wide range of other ionic species which complicates separation by means of nanofiltration are present in addition to the thiosulfate ions and formate ions to be separated. In particular, these are other divalent ions, such as sulfite. If a plurality of divalent ion species is present, the retention of the individual species is reduced. By skillful adjustment of the pH to, particularly preferably, between pH=4 and pH=4.5, the retention for thiosulfate at the membrane increases considerably. At the same time, the retention of the total sulfite comprised in the wastewater of the formate process, comprising disulfite, sulfite and hydrogen sulfite, can be reduced by this pH adjustment, so that this too can be recycled together with the sodium formate partly to the synthesis.

Preferably, the pH of the residual mother liquor is adjusted before step (d) by bubbling sulfur dioxide or by metering formic acid into the residual mother liquor. However, any other suitable method known to a person skilled in the art for adjusting the pH may also be used.

In a preferred embodiment of the process according to the invention, the nanofiltration in step (d) is carried out with a transmembrane velocity of from 0.05 m/s to 8 m/s, particularly preferably from 0.1 m/s to 4 m/s. Sufficient transmembrane flow is necessary in order to avoid a concentration polarization on the membrane surface. Too high a transmembrane velocity produces a large pressure drop.

In a preferred embodiment of the process according to the invention, the nanofiltration in step (d) is carried out with a transmembrane pressure difference of from 5 bar to 70 bar, preferably from 10 bar to 50 bar, particularly preferably from 20 bar to 30 bar. The transmembrane pressure difference is present between permeate space and retentate space. As a result of this pressure difference, the osmotic pressure generated in the nanofiltration is overcome and a permeate flow which is as high as possible is achieved in association with a membrane area which is as small as possible.

In a preferred embodiment of the process according to the invention, the temperature of the residual mother liquor fed to step (d) is from 20° C. to 90° C., particularly preferably from 30° C. to 50° C. At these temperatures, it is possible to use economical polymeric membranes if these are stable. Furthermore, these temperatures can be economically established (river water, low-pressure steam), the boiling point of the residual mother liquor is not exceeded and sufficiently high permeate flows are achieved.

The concentration of sodium formate in the second part-stream in step (e) is preferably effected by a thermal method or by membrane methods, such as reverse osmosis or pervaporation. A known thermal method for concentrations consists, for example, in the evaporation of the water. Reverse osmosis is a known pressure-driven membrane method in which a pressure which is greater than the osmotic pressure of the liquid is applied to the water-comprising liquid which is in contact with a semipermeable membrane. Consequently, the water is forced through the membrane. Particles dissolved in the water (for example formate ions) cannot pass through the membrane. The formate-containing solution can thus be concentrated. For the concentration of the formate-containing solution in process step (e), however, it is also possible to use other methods known to the person skilled in the art and combinations of two or more such methods.

The concentration in step (e) is preferably effected to a proportion of <30%, in particular <15%, of water in the concentrated second part-stream, based on the original amount of water.

In a preferred embodiment of the process according to the invention, the recycling in step (f) is carried out in an amount such that a thiosulfate concentration of 5000 ppm, preferably 2500 ppm, particularly preferably 1000 ppm, in the synthesis batch is not exceeded. At higher thiosulfate concentrations in the recycle stream, the synthesis and the subsequent filtration of the product are disturbed.

The invention is explained in more detail below with reference to examples.

EXAMPLE 1

A polymeric nanofiltration membrane (Desal 5 DK, GE Osmonics Inc.) is brought into contact with production wastewater having a composition typical for wastewater from the sodium dithionite synthesis and as present after step (c) of the process according to the invention. The solution comprises 30 g/l of total sulfite, 12 g/l of sodium thiosulfate and 60 g/l of sodium formate and has a pH of 5.6. The transmembrane pressure in the nanofiltration is 10 bar and the temperature is 40° C. The solution flows across the membrane at a transmembrane velocity of 0.5 m/s. The solution is concentrated with a mass concentration factor (MC=[retentate mass at the beginning]/[retentate mass at time t]) of 1.5. The following retentions (R=1−[Concentration of permeate]/[Concentration of retentate]) are determined:

| | Mean permeate flow | Retention in % | | |
|---|---|---|---|---|
| MC | [kg/m²h] | Formate | Thiosulfate | Total sulfite |
| 1.5 | 59.1 | 0 | 63 | 30 |

EXAMPLE 2

The solution from example 1 is brought to a pH of 4.0 by bubbling in sulfur dioxide. The solution is then brought into contact with the same membrane as in example 1 at 40° C., a transmembrane velocity of 0.5 m/s and a transmembrane pressure of 20 bar. The solution is concentrated with a mass concentration factor of 2.2. The following results are obtained:

| | Mean permeate flow | Retention in % | | |
|---|---|---|---|---|
| MC | [kg/m²h] | Formate | Thiosulfate | Total sulfite |
| 2.2 | 56.1 | −3 | 80 | 10 |

At the reduced pH, a greater retention for the thiosulfate can therefore be achieved. For the total sulfite, the membrane has a lower retention so that its concentration in the permeate can be increased compared with example 1.

We claim:

1. A process for preparing sodium dithionite, comprising the steps of
    (a) preparing a sodium dithionite mother liquor from a synthesis batch comprising sodium formate, sulfur dioxide, and an alkaline sodium compound in aqueous methanolic solution, wherein said sodium dithionite mother liquor comprises sodium dithionite;
    (b) isolating sodium dithionite from the sodium dithionite mother liquor of step (a) to form a residual mother liquor;
    (c) separating methanol from the residual mother liquor of step (b);
    (d) lowering the pH of the residual mother liquor of step (c) to a value in the range of from 4 to 6;
    (e) separating the residual mother liquor of step (d) into a thiosulfate-rich, first part stream and a thiosulfate-poor, sodium formate-containing, second part stream by means of nanofiltration;
    (f) concentrating the sodium formate in the second part-stream of step (e) to form a concentrated second part-stream; and
    (g) recycling the concentrated second part-stream of step (f) back to step (a).

2. The process according to claim 1, wherein said pH value is in the range of from 4 to 4.5.

3. The process according to claim 1, wherein step (d) is performed by bubbling sulfur dioxide into the residual mother liquor or by metering formic acid into the residual mother liquor.

4. The process according to claim 1, wherein step (f) is performed by a thermal method, a membrane method, or by any combination thereof.

5. The process according to claim 4, wherein said membrane method is a reverse osmosis method.

6. The process according to claim 1, wherein step (f) results in a second part-stream having a proportion of water of less than 30% based on the total amount of water in the second part-stream of step (e).

7. The process according to claim 1, wherein step (g) does not cause the thiosulfate concentration in the synthesis batch of step (a) to exceed 5000 ppm.

8. The process according to claim 1, wherein the alkaline sodium compound is selected from the group consisting of sodium carbonate, sodium bicarbonate, and sodium hydroxide.

* * * * *